(12) United States Patent
Song et al.

(10) Patent No.: US 9,519,597 B2
(45) Date of Patent: Dec. 13, 2016

(54) COMMUNICATION APPARATUS AND METHOD BASED ON SHARED MEMORY

(71) Applicant: ELECTRONICS AND TELECOMMUNICATIONS RESEARCH INSTITUTE, Daejeon (KR)

(72) Inventors: Byoung-Youl Song, Daejeon (KR); Choul-Soo Jang, Daejeon (KR); Sung-Hoon Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 31 days.

(21) Appl. No.: 14/589,387

(22) Filed: Jan. 5, 2015

(65) Prior Publication Data

US 2015/0193356 A1   Jul. 9, 2015

(30) Foreign Application Priority Data

Jan. 7, 2014   (KR) .......................... 10-2014-0002004

(51) Int. Cl.
*G06F 12/14*   (2006.01)
*G06F 12/08*   (2016.01)

(52) U.S. Cl.
CPC ......... *G06F 12/1466* (2013.01); *G06F 12/084* (2013.01); *G06F 12/0837* (2013.01); *G06F 12/1433* (2013.01)

(58) Field of Classification Search
CPC .. G06F 9/468; G06F 12/1458; G06F 12/1466; G06F 12/1483; G06F 21/44; G06F 21/445; G06F 21/62; G06F 21/78

USPC .......... 710/200; 711/152, 163, 164
See application file for complete search history.

(56) References Cited

U.S. PATENT DOCUMENTS

| | | | |
|---|---|---|---|
| 2002/0138706 A1* | 9/2002 | Hugly | G06F 9/52 711/163 |
| 2010/0138673 A1* | 6/2010 | Jogand-Coulomb | G06F 21/10 713/193 |
| 2010/0174875 A1* | 7/2010 | Dice | G06F 9/52 711/152 |
| 2011/0131289 A1 | 6/2011 | Kim | |
| 2014/0258645 A1* | 9/2014 | Dice | G06F 9/528 711/152 |

FOREIGN PATENT DOCUMENTS

| KR | 10-1994-0007707 A | 4/1994 |
|---|---|---|
| KR | 10-2012-0067865 A | 6/2012 |

* cited by examiner

*Primary Examiner* — Gary Portka
(74) *Attorney, Agent, or Firm* — Rabin & Berdo, P.C.

(57) ABSTRACT

A communication apparatus and method based on shared memory are disclosed. The communication apparatus based on shared memory includes a data publication unit, a data subscription unit, and an access control unit. The data publication unit publishes data stored in a shared memory unit. The data subscription unit subscribes to the data stored in the shared memory unit. The access control unit controls the access of the data publication unit and the data subscription unit to the shared memory unit in response to locking operation instructions of the data publication unit and the data subscription unit with respect to the shared memory unit.

16 Claims, 7 Drawing Sheets

COMMUNICATION APPARATUS AND METHOD BASED ON SHARED MEMORY

CROSS-REFERENCE TO RELATED APPLICATION

This application claims the benefit of Korean Patent Application No. 10-2014-0002004, filed Jan. 7, 2014, which is hereby incorporated by reference herein in its entirety.

BACKGROUND

1. Technical Field

The present disclosure relates generally to a communication apparatus and method based on shared memory and, more particularly, to a communication apparatus and method based on shared memory, which control access to shared memory among pluralities of data publishers and data subscribers.

2. Description of the Related Art

In general, when pluralities of data subscribers and data publishers send and receive data through shared memory, a publisher activates a locking function while the publisher is performing writing on the shared memory, and thus prevents another publisher or subscriber from accessing the shared memory. When the locking function is deactivated, a subscriber may fetch the changed data from the shared memory. The subscriber also activates a function of locking the shared memory in order to indicate that the changed data has been read.

However, this conventional method is problematic in that, if a data subscriber or a data publisher who has used the shared memory in the process of locking the shared memory and then changing data is subjected to termination without performing unlocking due to an internal error or other problems, another data subscriber or another data publisher cannot access the shared memory.

For this purpose, a method has been proposed in which a standby data subscriber or a standby data publisher performs forced unlocking if a data subscriber or a data publisher who occupies shared memory is subjected to termination. However, in this case, unlocking operations may be simultaneously performed in the state in which pluralities of data publishers and data subscribers are simultaneously on standby. Accordingly, when a single data publisher or a single data subscriber locks shared memory again after performing forced unlocking and then performs a task, another data publisher or another data subscriber may mistake the locking of the shared memory, performed by the data publisher or the data subscriber who performed the forced unlocking, as the locking of the shared memory that had performed by a data publisher or a data subscriber who had been subjected to termination, and may then perform forced unlocking again. As a result, this method is problematic in that pluralities of data publishers and data subscribers may simultaneously access the shared memory because the pluralities of data publishers and data subscribers successively release the locking states of each other.

As related technology, Korean Patent Application Publication No. 10-2012-0067865 discloses a method and apparatus for shared memory channel multiplexing.

SUMMARY

Accordingly, some embodiments of the present invention are intended to provide a communication apparatus and method based on shared memory, which are capable of controlling access to shared memory among pluralities of data publishers and data subscribers.

Some embodiments of the present invention are intended to provide a communication apparatus and method based on shared memory, which are capable of performing unlocking if a data publisher and a data subscriber are subjected to termination without performing unlocking.

Some embodiments of the present invention are intended to provide a communication apparatus and method based on shared memory, which enables a data publisher to check the state of the subscription completion of a data subscriber.

In accordance with another aspect of the present invention, there is provided a communication apparatus based on shared memory, including a data publication unit configured to publish data stored in a shared memory unit; a data subscription unit configured to subscribe to the data stored in the shared memory unit; and an access control unit configured to control the access of the data publication unit and the data subscription unit to the shared memory unit in response to locking operation instructions of the data publication unit and the data subscription unit with respect to the shared memory unit.

The data publication unit may include a first locking management unit configured to monitor a locking state of the shared memory unit, and to instruct the access control unit to perform a locking operation in order to have a right to access the shared memory unit authenticated; a subscription list generation unit configured to generate a subscription list of at least one data subscription unit that now has accessed the shared memory unit once the right to access the shared memory unit has been authenticated; a first subscription management unit configured to determine whether or not the data subscription unit included in the list has completed subscription to data stored in the shared memory unit; and a data publication control unit configured to control publication, changing and deletion of the data.

The first locking management unit may be further configured to instruct the access control unit to perform a locking operation in order to have the right to access the shared memory unit authenticated, the first locking management unit repeatedly instructing the access control unit to perform the locking operation until the locking operation is completed.

The first locking management unit may be further configured to instruct the access control unit to perform an unlocking operation once publication, changing and deletion of the data has been completed by the data publication control unit.

The first locking management unit may be further configured to instruct the access control unit to perform an unlocking operation if termination has been performed without unlocking of the shared memory unit by the access control unit.

The data subscription unit may include a subscription registration unit configured to perform registration with the shared memory unit; a second locking management unit configured to monitor a locking state of the shared memory unit, and to instruct the access control unit to perform a locking operation in order to have the right to access the shared memory unit authenticated; a second subscription management unit configured to check whether or not subscription to the data stored in the shared memory unit is present; and a data subscription control unit configured to control the subscription to the data.

The second locking management unit may be further configured to instruct the access control unit to perform the locking operation until the right to access the shared memory unit is authenticated.

The second locking management unit may be further configured to instruct the access control unit to perform an unlocking operation once the subscription to the data has been completed by the data subscription control unit.

The second locking management unit may be further configured to instruct the access control unit to perform an unlocking operation if termination has been performed without unlocking of the shared memory unit by the access control unit.

The shared memory unit may include a control region that is used to control access and subscription conditions of the data publication unit and the data subscription unit; and a data region that is used to share data between the data publication unit and the data subscription unit.

In accordance with another aspect of the present invention, there is provided a communication method based on shared memory, including publishing, by a data publication unit, data stored in a shared memory unit; subscribing, by a data subscription unit, to the data stored in the shared memory unit; and controlling, by an access control unit, the access of the data publication unit and the data subscription unit to the shared memory unit in response to locking operation instructions of the data publication unit and the data subscription unit with respect to the shared memory unit.

Publishing, by the data publication unit, the data stored in the shared memory unit may include monitoring a locking state of the shared memory unit, and instructing the access control unit to perform a locking operation in order to have a right to access the shared memory unit authenticated; generating a subscription list of at least one data subscription unit that now has accessed the shared memory unit once the right to access the shared memory unit has been authenticated; determining whether or not the data subscription unit included in the list has subscribed to the data stored in the shared memory unit; and controlling publication, changing and deletion of the data.

Instructing the access control unit to perform the locking operation in order to have the right to access the shared memory unit authenticated may include instructing the access control unit to perform the locking operation in order to have the right to access the shared memory unit authenticated, the access control unit being repeatedly instructed to perform the locking operation until the locking operation is completed.

Instructing the access control unit to perform the locking operation in order to have the right to access the shared memory unit authenticated may include instructing the access control unit to perform the unlocking operation once publication, changing and deletion of the data has been completed by the data publication control unit.

Instructing the access control unit to perform the locking operation in order to have the right to access the shared memory unit authenticated may include instructing the access control unit to perform an unlocking operation if termination has been performed without unlocking of the shared memory unit by the access control unit.

Subscribing, by a data subscription unit, to the data stored in the shared memory unit may include being registered with the shared memory unit; monitoring a locking state of the shared memory unit, and instructing the access control unit to perform a locking operation in order to have the right to access the shared memory unit authenticated; checking whether or not subscription to the data stored in the shared memory unit is present; and controlling the subscription to the data.

Instructing the access control unit to perform the locking operation in order to have the right to access the shared memory unit authenticated may include instructing the access control unit to perform the locking operation until the right to access the shared memory unit is authenticated.

Instructing the access control unit to perform the locking operation in order to have the right to access the shared memory unit authenticated may include instructing the access control unit to perform an unlocking operation once the subscription to the data has been completed by the data subscription control unit.

Instructing the access control unit to perform the locking operation in order to have the right to access the shared memory unit authenticated may include instructing the access control unit to perform an unlocking operation if termination has been performed without unlocking of the shared memory unit by the access control unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
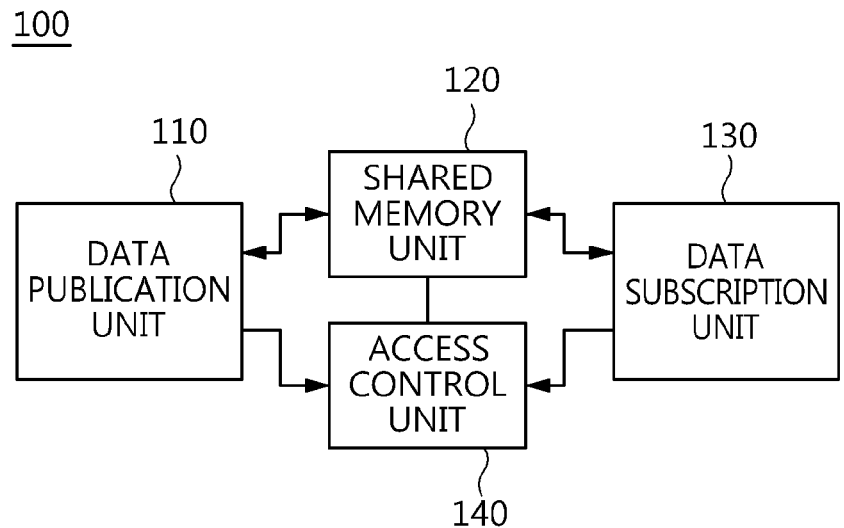
FIG. 1 is a diagram illustrating the configuration of a communication apparatus based on shared memory according to an embodiment of the present invention.

Embodiments of the present invention will be described in detail below with reference to the accompanying drawings.

Repeated descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

A communication apparatus and method based on shared memory according to embodiments of the present invention are described in detail below with reference to the accompanying drawings.

FIG. 1 is a diagram illustrating the configuration of a communication apparatus 100 based on shared memory according to an embodiment of the present invention.

Referring to FIG. 1, the communication apparatus 100 based on shared memory according to this embodiment of the present invention basically includes a data publication unit 110, a shared memory unit 120, a data subscription unit 130, and an access control unit 140. In this case, the data publication unit 110 and the data subscription unit 130 may be present together in the same process, or may be present in respective different processes.

The data publication unit 110 publishes data stored in the shared memory unit 120.

The shared memory unit 120 stores data shared by the data publication unit 110 and the data subscription unit 130. The shared memory unit 120 includes a control region A used to control the access and subscription conditions of the data publication unit 110 and the data subscription unit 130, and a data region B used to share data between the data publication unit 110 and the data subscription unit 130. The control region and the data region are described in detail later with reference to FIGS. 4 and 5.

The data subscription unit 130 subscribes to the data stored in the shared memory unit 120.

The access control unit 140 controls the access of the data publication unit 110 and the data subscription unit 130 to the shared memory unit 120 in response to locking operation instructions of the data publication unit 110 and the data subscription unit 130 with respect to the shared memory unit 120. That is, the access control unit 140 controls access between the data publication unit 110 and the shared memory unit 120 and between the data subscription unit 130 and the shared memory unit 120 in response to locking or unlocking instructions of the data publication unit 110 and the data subscription unit 130. In this case, the access control unit 140 may be implemented as semaphore.

Figure 2:
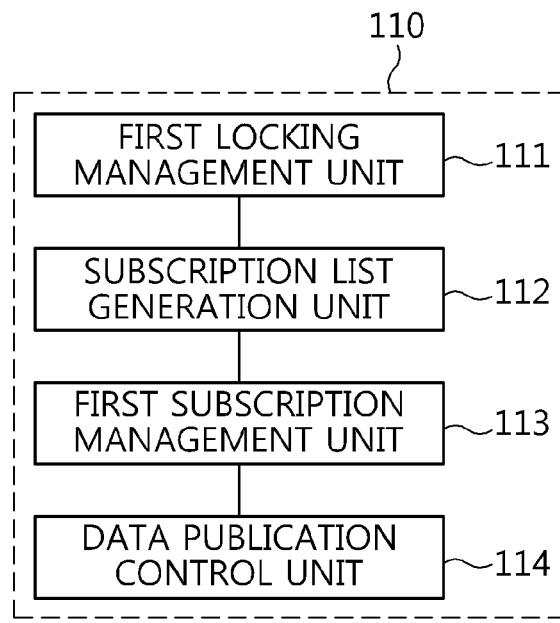
FIG. 2 is a diagram illustrating the detailed configuration of a data publication unit that is adopted by the communication apparatus based on shared memory according to an embodiment of the present invention.

FIG. 2 is a diagram illustrating the detailed configuration of the data publication unit 110 that is adopted by the communication apparatus based on shared memory according to an embodiment of the present invention.

Referring to FIG. 2, the data publication unit 110 according to this embodiment of the present invention publishes data stored in the shared memory unit 120.

For this purpose, the data publication unit 110 includes a first locking management unit 111, a subscription list generation unit 112, a first subscription management unit 113, and a data publication control unit 114.

The first locking management unit 111 monitors a locking state between the data publication unit 110 and the shared memory unit 120, and instructs the access control unit 140 to perform a locking operation in order to have the right to access the shared memory unit 120 authenticated. The first locking management unit 111 instructs the access control unit 140 to perform a locking operation in order to have the right to access the shared memory unit 120 authenticated, and repeatedly instructs the access control unit 140 to perform the locking operation until the locking operation is completed. Furthermore, once the publication, changing and deletion of data has been completed by the data publication control unit 114, the first locking management unit 111 instructs the access control unit 140 to perform an unlocking operation. Furthermore, if termination has been performed without the unlocking of the shared memory unit 120 by the access control unit of another data publication unit or another data subscription unit, the first locking management unit 111 may instruct the access control unit 140 to perform an unlocking operation, and thus the corresponding data publication unit can access the shared memory unit 120.

Once the right to access the shared memory unit 120 has been authenticated, the subscription list generation unit 112 generates a subscription list of at least one data subscription unit 130 that now has accessed the shared memory unit 120. That is, the subscription list generation unit 112 generates a subscription list of the data subscription unit 130 by referring to the control region of the shared memory unit 120.

The first subscription management unit 113 manages whether the data subscription unit 130 included in the list has completed the subscription to the data stored in the shared memory unit 120. That is, the first subscription management unit 113 extracts a data subscription unit 130, whose data subscription has not been completed, from the data subscription unit 130 included in the list by referring to the control region of the shared memory unit 120, and then prevents the publication, changing and deletion of data from being performed by the data publication control unit 114 until the subscription is completed.

The data publication control unit 114 controls the publication, changing and deletion of the data stored in the shared memory unit 120.

Figure 3:
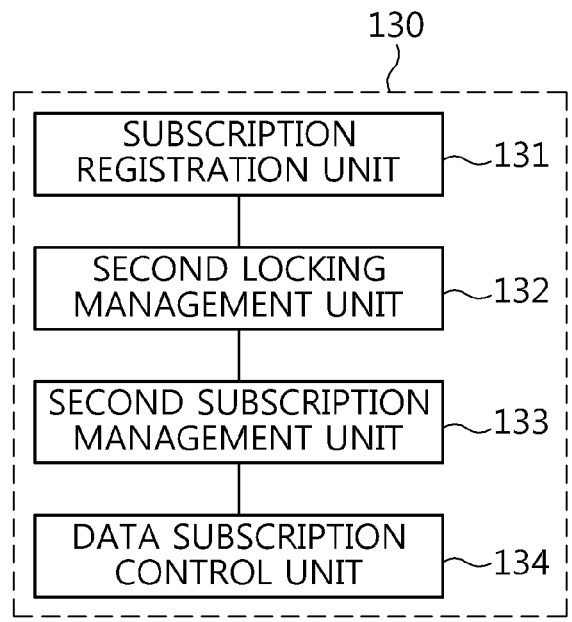
FIG. 3 is a diagram illustrating the detailed configuration of a data subscription unit that is adopted by the communication apparatus based on shared memory according to an embodiment of the present invention.

FIG. 3 is a diagram illustrating the detailed configuration of the data subscription unit 130 that is adopted by the communication apparatus based on shared memory according to an embodiment of the present invention.

Referring to FIG. 3, the data subscription unit 130 according to this embodiment of the present invention subscribes to data stored in the shared memory unit 120.

For this purpose, the data subscription unit 130 includes a subscription registration unit 131, a second locking management unit 132, a second subscription management unit 133, and a data subscription control unit 134.

The subscription registration unit 131 is registered with the shared memory unit 120. The subscription registration unit 131 is registered with the shared memory unit 120 as a subscriber.

The second locking management unit 132 monitors a locking state between the data subscription unit 130 and the shared memory unit 120, and instructs the access control unit 140 to perform a locking operation in order to have the right to access the shared memory unit 120 authenticated. The second locking management unit 132 instructs the access control unit 140 to perform the locking operation until the right to access the shared memory unit 120 is authenticated. Furthermore, once the subscription to the data has been completed, the second locking management unit 132 instructs the access control unit 140 to perform an unlocking operation. Furthermore, if termination has been performed without the unlocking of the shared memory unit 120 by the access control unit of another data publication unit 110 or another data subscription unit 130, the second locking management unit 132 instructs the access control unit 140 to perform an unlocking operation, and thus the corresponding data subscription unit 130 can access the shared memory unit 120.

The second subscription management unit 133 checks the state of subscription to data stored in the shared memory unit 120.

The data subscription control unit 134 controls the subscription to the data stored in the shared memory unit 120. The data subscription control unit 134 subscribes to the data stored in the shared memory unit 120, and incorporates information about the state of subscription to data into the control region of the shared memory unit 120.

Figure 4:
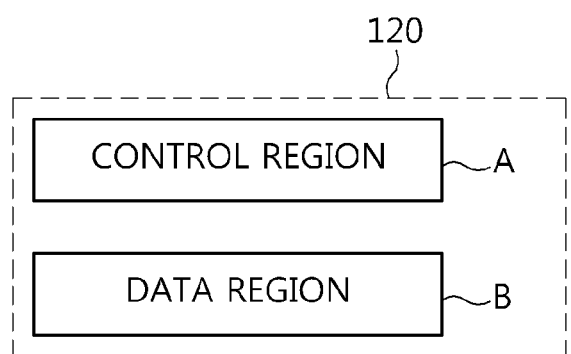
FIG. 4 is a diagram illustrating the detailed configuration of a shared memory unit that is adopted by the communication apparatus based on shared memory according to an embodiment of the present invention.
Figure 5:
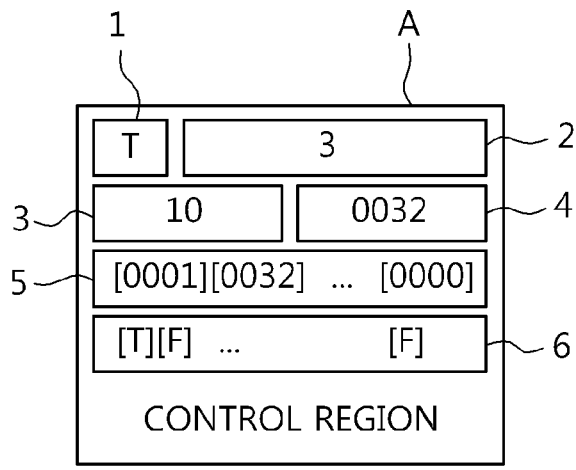
FIG. 5 is a diagram illustrating the structure of a control region that is included in the shared memory unit of FIG. 4.

FIG. 4 is a diagram illustrating the detailed configuration of the shared memory unit 120 that is adopted by the communication apparatus based on shared memory according to an embodiment of the present invention, and FIG. 5 is a diagram illustrating the structure of the control region that is included in the shared memory unit of FIG. 4.

Referring to FIG. 4 the shared memory unit 120 according to this embodiment of the present invention stores data shared by the data publication unit 110 and the data subscription unit 130. The shared memory unit 120 includes the control region "A" used to control the access and subscription conditions of the data publication unit 110 and the data subscription unit 130, and the data region "B" used to share data between the data publication unit 110 and the data subscription unit 130. More specifically, as illustrated in FIG. 5, the control region A includes any one of a data change indication field 1 adapted to indicate whether the data region B has been changed, a data index field 2 adapted to prevent the retransmission of data, a subscriber number field 3 adapted to indicate the number of subscribers present in a subscription list, the process identifier field 4 of the data subscription unit 130 or the data publication unit 110 having the right to access the shared memory unit 120, a subscription list field 5 adapted to indicate a list of at least one registered data subscription unit 130, and a subscription indication field 6 adapted to indicate whether or not subscription is present in conformity with the list of the registered data subscription unit 130.

Figure 6:
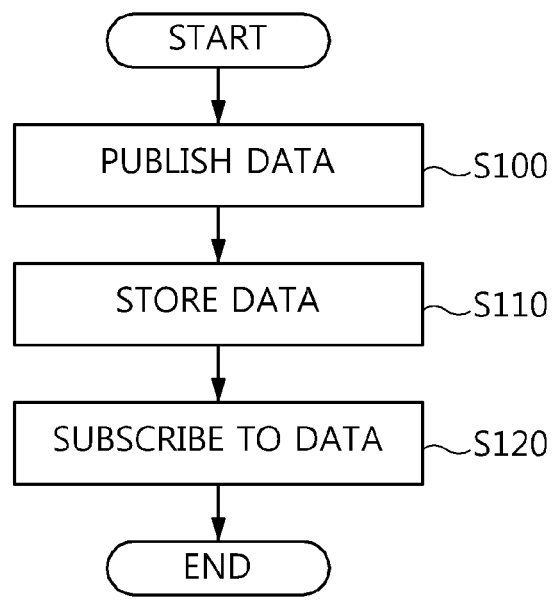
FIG. 6 is a flowchart illustrating the sequence of a communication method based on shared memory according to an embodiment of the present invention.

FIG. 6 is a flowchart illustrating the sequence of a communication method based on shared memory according to an embodiment of the present invention.

Referring to FIG. 6, the communication method based on shared memory according to this embodiment of the present invention is performed using the above-described communication apparatus based on shared memory. Redundant descriptions thereof are omitted below.

First, the data publication unit 110 publishes data stored in the shared memory unit 120 at step S100. At step S100, a locking state between the data publication unit 110 and the shared memory unit 120 is monitored, and an instruction to perform a locking operation is issued in order to have the right to access the shared memory unit 120 authenticated. Once the right to access the shared memory unit 120 has been authenticated, a subscription list of at least one data subscription unit 130 that now has accessed the shared memory unit 120 is generated, whether or not the data subscription unit 130 included in the list has completed the subscription to the data stored in the shared memory unit 120 is managed, and the publication, changing and deletion of the data are controlled.

Thereafter, data shared by the data publication unit 110 and the data subscription unit 130 is stored in the shared memory unit 120 at step S110.

Thereafter, subscription to the data stored in the shared memory unit 120 is performed at step S120. At step S120, the subscription registration unit 131 is registered with the shared memory unit 120, monitors a locking state between the subscription registration unit 131 and the shared memory unit 120, instructs the access control unit 140 to perform a locking operation in order to have the right to access the shared memory unit 120 authenticated, checks whether the subscription to the data stored in the shared memory unit 120 is present, and controls the subscription to the data.

Figure 7:
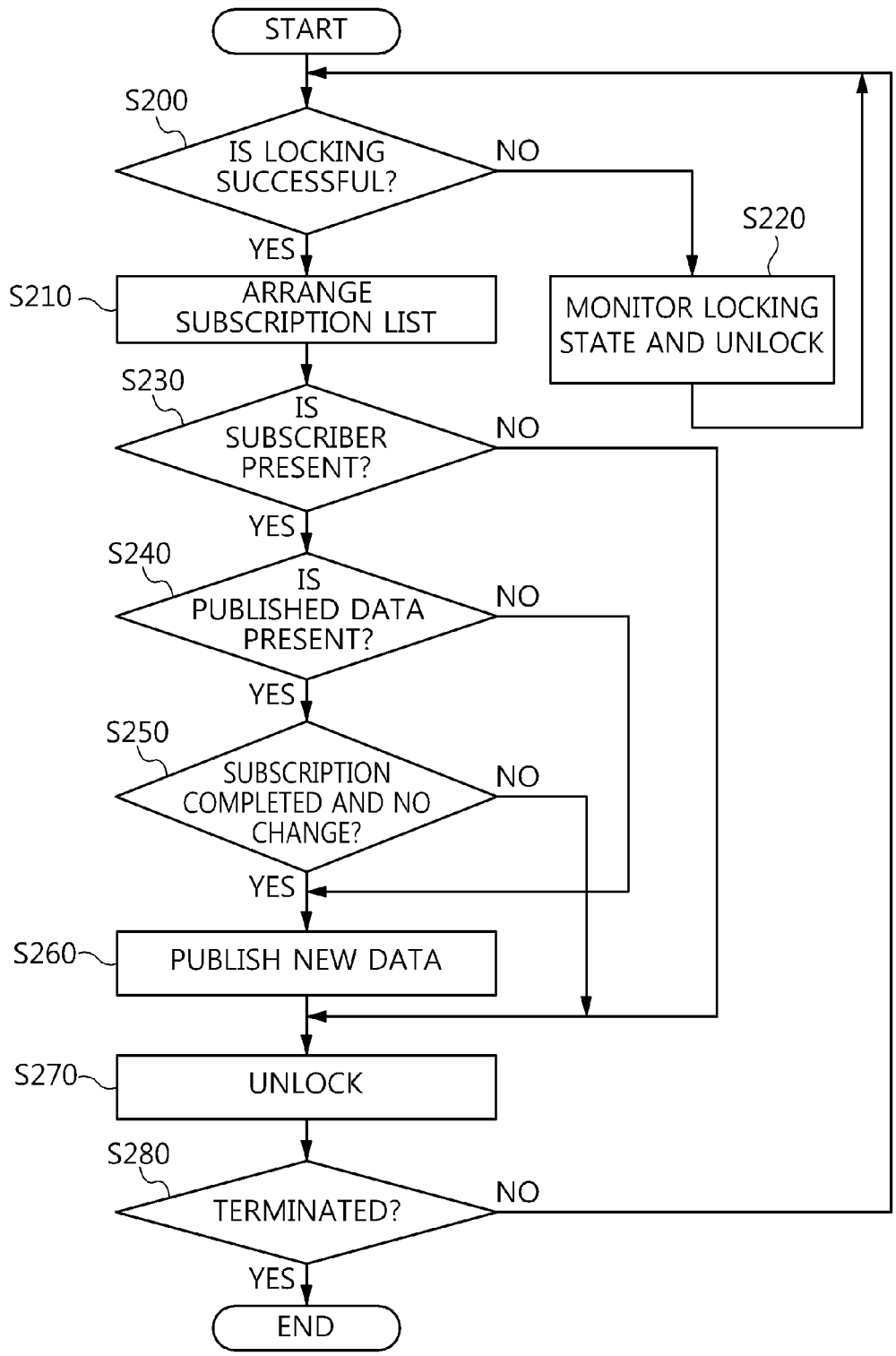
FIG. 7 is a flowchart illustrating the sequence in which data is published in the communication method based on shared memory according to an embodiment of the present invention.

FIG. 7 is a flowchart illustrating the sequence in which data is published in the communication method based on shared memory according to an embodiment of the present invention.

Referring to FIG. 7, in accordance with the sequence in which data is published according to this embodiment of the present invention, first, if a locking operation configured to have the right to access the control region of the shared memory unit 120 authenticated is successful at step S200, the process identifier of a current subscriber is stored in the process identifier field of the control region. Thereafter, whether or not the performance of the data subscription unit 130 included in the subscription list has been terminated is checked. The subscription list is arranged in such a manner that a subscriber whose performance has been terminated is removed from the subscription list if the subscriber is present and other subscribers whose performance has not been terminated are moved to a corresponding location at step S210. If a data subscription unit 130 is present at step S230 after the subscription list has been arranged at step S210, whether or not already published data is present is checked using the data change indication field of the shared memory unit 120 at step S240. If, as a result of the checking at step S240, it is determined that the already published data is present, whether or not all data subscription units 130 have completed the subscription to the data is checked by checking the subscription list at step S250. If, as a result of the checking at step S250, it is determined that all the data subscription units 130 have completed the subscription to the data and data to be newly published is present, a new data publication process of writing the new data in the data region of the shared memory unit 120 and then performing initialization by increasing the index of the data and thus not reading subscriptions in the subscription list is performed at step S260. Once the new data has been published at step S260, the access control unit 140 is instructed to perform an unlocking operation at step S270, and thus another data publication unit 110 or another data subscription unit 130 can access the shared memory unit 120. Thereafter, at step S280, the process of publishing data is terminated if a termination request is present; otherwise the process of publishing data is repeatedly performed.

Furthermore, if the locking operation is not successful at step S200, step S200 of monitoring a locking state and performing an unlocking operation is repeatedly performed until the locking operation is successful.

Furthermore, if, as a result of the checking at step S230, it is determined that a data subscription unit 130 is not present after the subscription list has been arranged at step S210, an unlocking operation is performed at step S270.

Furthermore, if, as a result of the checking at step S240, it is determined that already published data is not present, the subscription list is initialized and also new data is published at step S260 without checking whether or not subscription to the data has been completed at step S250.

Furthermore, if it has been determined at step S240 that the already published data is present and then it is determined at step S250 that the subscription to the data has not been completed, an unlocking operation is performed at step S270.

Figure 8:
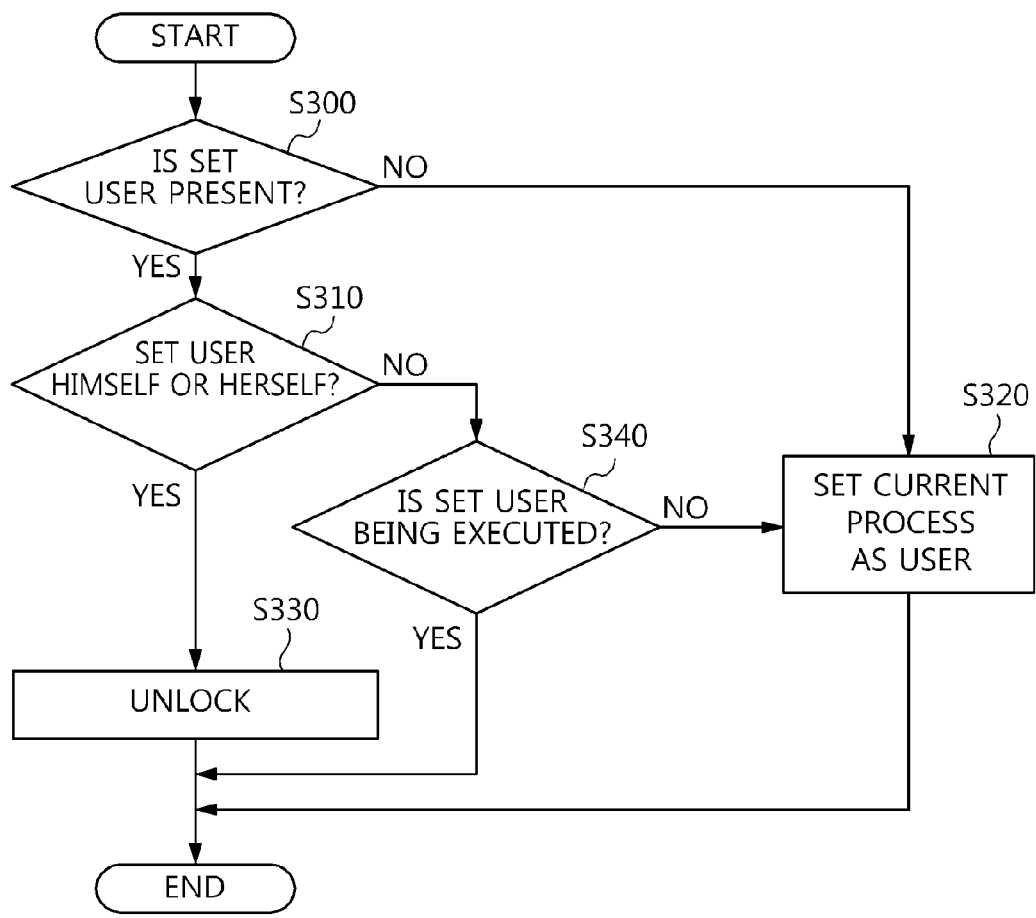
FIG. 8 is a diagram illustrating the sequence in which an unlocking operation is performed by monitoring the locking state of the shared memory unit in the communication method based on shared memory according to an embodiment of the present invention.

FIG. 8 is a diagram illustrating the sequence in which an unlocking operation is performed by monitoring the locking state of the shared memory unit 120 in the communication method based on shared memory according to an embodiment of the present invention.

Referring to FIG. 8, in accordance with the sequence in which a unlocking operation is performed by monitoring a locking state according to this embodiment of the present invention, first, the data publication unit 110 or the data subscription unit 130 checks whether or not a data publication unit 110 and a data subscription unit 130 having the right to access the shared memory unit 120 are present based on the identifier field of the control region at step S300. If, as a result of the checking at step S300, it is determined that a registered data publication unit 110 and a registered data subscription unit 130 are present, whether or not a corresponding identifier corresponds to a process that is now monitoring a locking state and performing an unlocking operation is checked at step S310. That is, if the corresponding identifier has the right to perform an unlocking operation, the unlocking operation is performed at step S330.

Furthermore, if, as a result of the checking at step S310, it is determined that the registered data publication unit 110 and the registered data subscription unit 130 are not present, the process that is now monitoring a locking state and performing an unlocking operation is registered with the identifier field of the control region at step S320.

Furthermore, if, as a result of the checking at step S310, it is determined that the corresponding identifier does not correspond to the process that is now monitoring a locking state and performing an unlocking operation, whether or not a process corresponding to the identifier has been terminated is checked at step S340. If, as a result of the checking at step S340, it is determined that the process corresponding to the identifier has been terminated, the process that is now monitoring a locking state and performing an unlocking operation is registered with the identifier field of the control region at step S320.

Furthermore, if the process corresponding to the identifier has not been terminated, the process of monitoring the locking state and performing an unlocking operation is terminated. The process of monitoring the locking state and performing the unlocking operation may be repeatedly performed until the locking of the data publication unit 110 or the data subscription unit 130 is successful.

Figure 9:
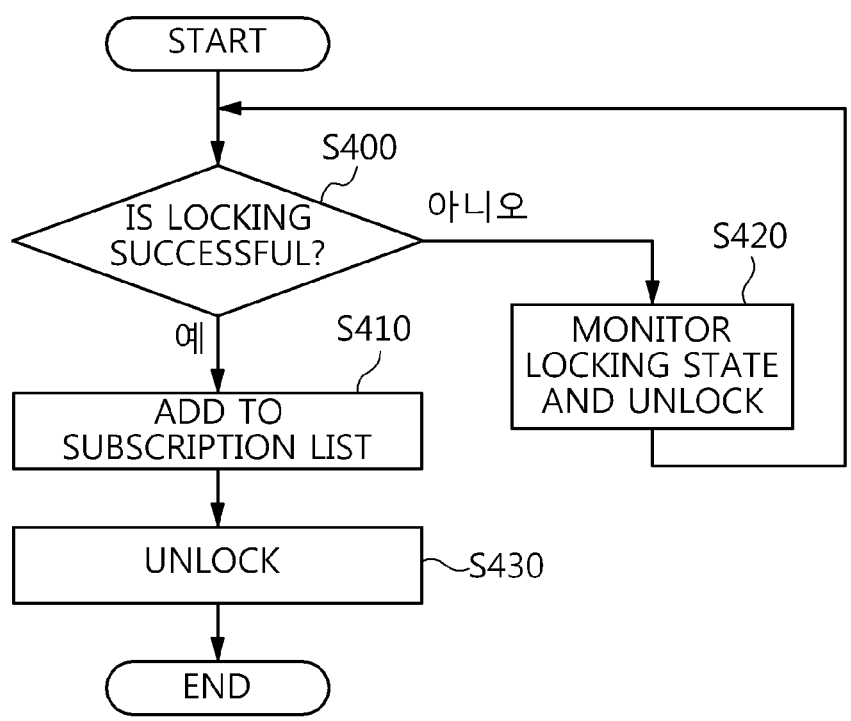
FIG. 9 is a flowchart illustrating the sequence in which subscription to data is performed in the communication method based on shared memory according to an embodiment of the present invention.

FIG. 9 is a flowchart illustrating the sequence in which subscription to data is performed in the communication method based on shared memory according to an embodiment of the present invention.

Referring to FIG. 9, in accordance with the sequence in which subscription to data is performed according to this embodiment of the present invention, first, the data subscription unit 130 determines whether or not a locking operation configured to have the right to access the shared memory unit 120 authenticated is successful at step S400. If, as a result of the determination, the locking operation configured to have the right to access the shared memory unit 120 authenticated is successful, the data subscription unit 130 stores the process identifier of a current subscriber in the identifier field of the control region. Thereafter, the process identifier is added to the subscription list of the control region, the subscriber number field of the control region is increased, an indication of whether or not subscription is present at a corresponding location of the subscription indication field is initialized, and the indication is added to the subscription list at step S410. Thereafter, the access control unit 140 is instructed to perform an unlocking operation at step S430 so that another data publication unit 110 or another data subscription unit 130 can access the shared memory unit 120. Furthermore, if, as a result of the determination at step S400, it is determined that the locking operation is not successful, a process of monitoring the locking state and performing an unlocking operation is repeatedly performed at step S420 until the locking operation is successful.

Figure 10:
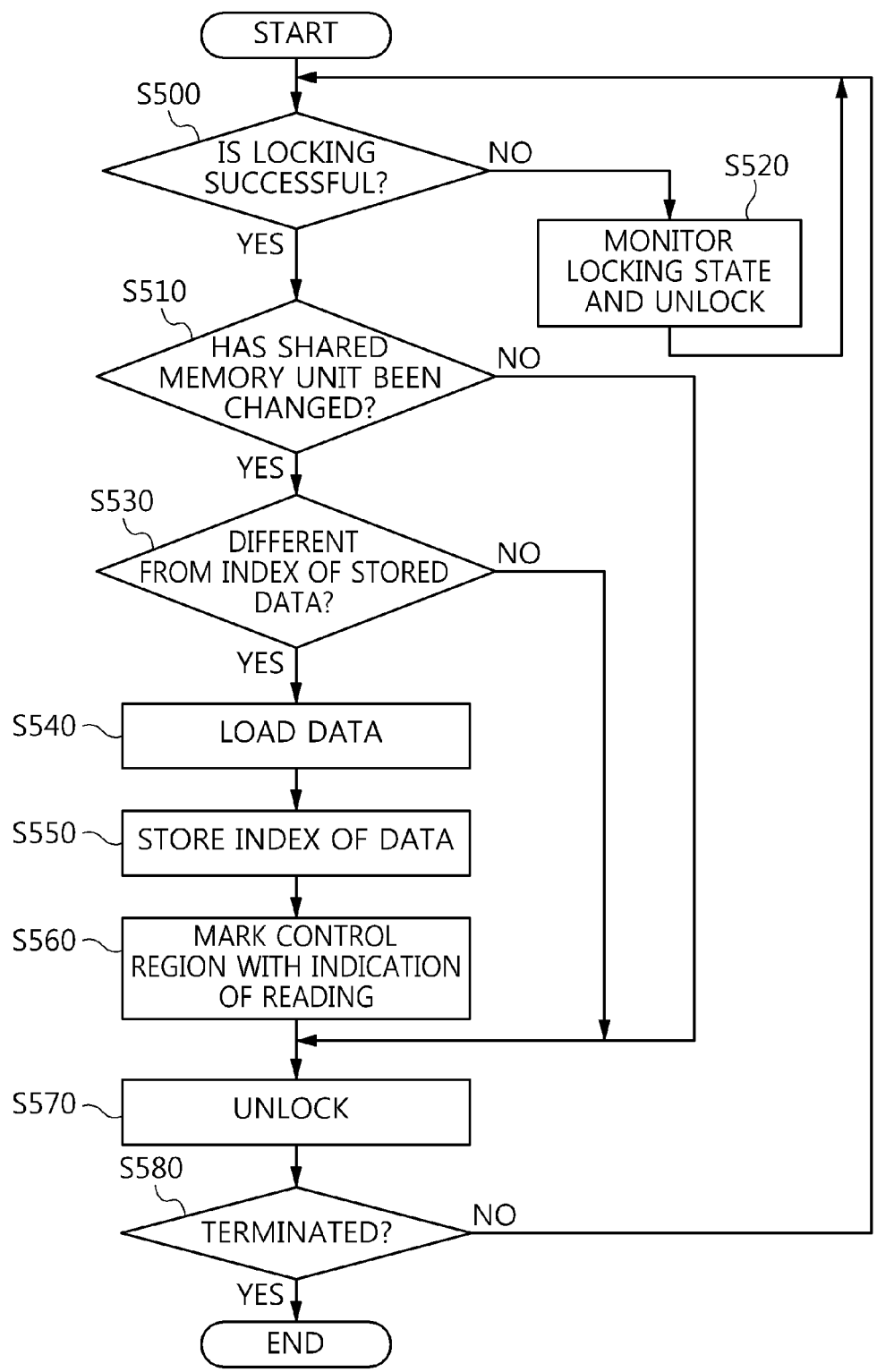
FIG. 10 is a diagram illustrating the sequence in which subscription is registered with the shared memory unit in the communication method based on shared memory according to an embodiment of the present invention.

FIG. 10 is a diagram illustrating the sequence in which subscription is registered with the shared memory unit 120 in the communication method based on shared memory according to an embodiment of the present invention.

Referring to FIG. 10, in accordance with the sequence in which subscription is registered with the shared memory unit 120 according to this embodiment of the present invention, first, the data subscription unit 130 determines whether or not a locking operation configured to have the right to access the shared memory unit 120 authenticated is successful at step S500. If, as a result of the determination at step S500, it is determined that the locking operation configured to have the right to access the shared memory unit 120 authenticated is successful, the data subscription unit 130 stores the process identifier of the current data subscription unit 130 in the identifier field of the control region. Furthermore, whether or not the shared memory has been changed is determined based on the data change indication field at step S510. If, as a result of the determination at step S510, it is determined that the shared memory has been changed based on the data change indication field, whether or not a changed data index field corresponds to already read data is checked at step S530. If, as a result of the checking at step S530, it is determined that the changed data index field does not correspond to the already read data, corresponding data is loaded from the shared memory unit 120 at step S540 and the index value of the read data is separately stored in order to check subsequent data subscription at step S550. Furthermore, the control region is marked with an indication that the data has been read at step S560, and the access control unit 140 is instructed to perform an unlocking operation at step S570 so that another data publication unit 110 or another data subscription unit 130 can access the shared memory unit 120.

Furthermore, if, as a result of the determination at step S500, the locking operation configured to have the right to access the shared memory unit 120 authenticated is not successful, a process of monitoring a locking state and performing an unlocking operation is repeatedly performed until the locking operation is successful at step S520.

Furthermore, if it is determined at step S510 that the shared memory has been not changed or it is determined at step S530 that the shared memory has been changed but the changed data index field corresponds to already read data, an unlocking operation is directly performed without the performance of a subscription process at step S570. Thereafter, at step S580, the subscription process is terminated if a termination request is received; otherwise a subscription process is repeatedly performed.

As described above, in accordance with the communication apparatus and method based on shared memory according to some embodiments of the present invention, access to shared memory can be controlled in response to locking operation instructions of pluralities of data publishers and data subscribers. Accordingly, the communication apparatus and method based on shared memory are advantageous in that if termination has been performed without an unlocking operation, an unlocking operation can be performed, and thus another data publisher and another data subscriber can access the shared memory.

The communication apparatus and method based on shared memory according to some embodiments of the present invention are advantageous in that a data publisher can check the state of the subscription completion of a data subscriber, thereby preventing the data publisher from accessing and changing data before the subscription of the data subscriber is completed.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A communication apparatus based on shared memory, comprising:
   a data publication unit configured to publish data stored in a shared memory unit;
   a data subscription unit configured to subscribe to the data stored in the shared memory unit; and
   an access control unit configured to control access of the data publication unit and the data subscription unit to the shared memory unit in response to locking operation instructions of the data publication unit and the data subscription unit with respect to the shared memory unit;
   wherein
   the data publication unit comprises a first locking management unit configured to monitor a locking state of the shared memory unit, and to instruct the access control unit to perform a locking operation in order to have a right to access the shared memory unit authenticated; and
   the first locking management unit is further configured to instruct the access control unit to perform an unlocking operation if termination has been performed without unlocking of the shared memory unit by the access control unit.

2. The communication apparatus of claim 1, wherein the data publication unit further comprises:
   a subscription list generation unit configured to generate a subscription list of at least one data subscription unit that now has accessed the shared memory unit once the right to access the shared memory unit has been authenticated;
   a first subscription management unit configured to determine whether or not the data subscription unit included in the list has completed subscription to data stored in the shared memory unit; and
   a data publication control unit configured to control publication, changing and deletion of the data.

3. The communication apparatus of claim 2, the first locking management unit repeatedly instructing the access control unit to perform the locking operation until the locking operation is completed.

4. The communication apparatus of claim 2, wherein the first locking management unit is further configured to instruct the access control unit to perform an unlocking operation once publication, changing and deletion of the data has been completed by the data publication control unit.

5. The communication apparatus of claim 1, wherein the data subscription unit comprises:
   a subscription registration unit configured to perform registration with the shared memory unit;
   a second locking management unit configured to monitor a locking state of the shared memory unit, and to instruct the access control unit to perform a locking operation in order to have the right to access the shared memory unit authenticated;
   a second subscription management unit configured to check whether or not subscription to the data stored in the shared memory unit is present; and
   a data subscription control unit configured to control the subscription to the data.

6. The communication apparatus of claim 5, wherein the second locking management unit is further configured to instruct the access control unit to perform the locking operation until the right to access the shared memory unit is authenticated.

7. The communication apparatus of claim 5, wherein the second locking management unit is further configured to instruct the access control unit to perform an unlocking operation once the subscription to the data has been completed by the data subscription control unit.

8. The communication apparatus of claim 5, wherein the second locking management unit is further configured to instruct the access control unit to perform an unlocking operation if termination has been performed without unlocking of the shared memory unit by the access control unit.

9. The communication apparatus of claim 1, wherein the shared memory unit comprises:
   a control region that is used to control access and subscription conditions of the data publication unit and the data subscription unit; and
   a data region that is used to share data between the data publication unit and the data subscription unit.

10. A communication method based on shared memory, comprising:
    publishing, by a data publication unit, data stored in a shared memory unit;
    subscribing, by a data subscription unit, to the data stored in the shared memory unit; and
    controlling, by an access control unit, access of the data publication unit and the data subscription unit to the shared memory unit in response to locking operation instructions of the data publication unit and the data subscription unit with respect to the shared memory unit;
    wherein publishing, by the data publication unit, the data stored in the shared memory unit comprises:
    monitoring a locking state of the shared memory unit, and instructing the access control unit to perform a locking operation in order to have a right to access the shared memory unit authenticated; and
    wherein instructing the access control unit to perform the locking operation in order to have the right to access the shared memory unit authenticated comprises instructing the access control unit to perform an unlocking operation if termination has been performed without unlocking of the shared memory unit by the access control unit.

11. The communication method of claim 10, wherein publishing, by the data publication unit, the data stored in the shared memory unit further comprises:
    generating a subscription list of at least one data subscription unit that now has accessed the shared memory unit once the right to access the shared memory unit has been authenticated;

determining whether or not the data subscription unit included in the list has subscribed to the data stored in the shared memory unit; and controlling publication, changing and deletion of the data.

12. The communication method of claim 11, the access control unit being repeatedly instructed to perform the locking operation until the locking operation is completed.

13. The communication method of claim 11, wherein instructing the access control unit to perform the locking operation in order to have the right to access the shared memory unit authenticated further comprises instructing the access control unit to perform the unlocking operation once publication, changing and deletion of the data has been completed by the data publication control unit.

14. The communication method of claim 10, wherein subscribing, by a data subscription unit, to the data stored in the shared memory unit comprises:

being registered with the shared memory unit;

monitoring the locking state of the shared memory unit, and instructing the access control unit to perform the locking operation in order to have the right to access the shared memory unit authenticated;

checking whether or not subscription to the data stored in the shared memory unit is present; and controlling the subscription to the data.

15. The communication method of claim 14, wherein instructing the access control unit to perform the locking operation in order to have the right to access the shared memory unit authenticated further comprises instructing the access control unit to perform the locking operation until the right to access the shared memory unit is authenticated.

16. The communication method of claim 14, wherein instructing the access control unit to perform the locking operation in order to have the right to access the shared memory unit authenticated further comprises instructing the access control unit to perform an unlocking operation once the subscription to the data has been completed by the data subscription control unit.

* * * * *